(12) United States Patent
Kuenkel et al.

(10) Patent No.: US 11,066,054 B2
(45) Date of Patent: Jul. 20, 2021

(54) VALVE ASSEMBLY AND ANTI-LOCK BRAKING SYSTEM INCLUDING THE SAME

(71) Applicant: MANDO CORPORATION, Pyeongtaek-si (KR)

(72) Inventors: Axel Kuenkel, Frankfurt am Main (DE); Ralf Leiter, Frankfurt am Main (DE)

(73) Assignee: MANDO CORPORATION, Pyeongtaek-si (KR)

( * ) Notice: Subject to any disclaimer, the term of this patent is extended or adjusted under 35 U.S.C. 154(b) by 11 days.

(21) Appl. No.: 15/916,846

(22) Filed: Mar. 9, 2018

(65) Prior Publication Data

US 2018/0334153 A1    Nov. 22, 2018

(51) Int. Cl.
B60T 8/36 (2006.01)
B60T 13/68 (2006.01)
(Continued)

(52) U.S. Cl.
CPC .............. B60T 8/363 (2013.01); B60T 8/364 (2013.01); B60T 8/3655 (2013.01);
(Continued)

(58) Field of Classification Search
CPC ...... B60T 13/686; B60T 8/3655; B60T 8/363; B60T 8/367; B60T 8/5025; B60T 13/68;
(Continued)

(56) References Cited

U.S. PATENT DOCUMENTS 3,378,031 A * 4/1968 Hatashita ............ F16K 31/0631
                                                            137/596.17
3,989,063 A * 11/1976 Brouwers ............... B60T 8/364
                                                            137/596.17
(Continued)

FOREIGN PATENT DOCUMENTS

DE        4108028 A1      9/1992
DE      19703759 A1 *    8/1998  .............. B60T 8/367
(Continued)

OTHER PUBLICATIONS

English translation of DE19703759A1 (Year: 1998).*
German Office Action dated Feb. 20, 2018 issued in German Patent Application No. 102017208310.7.

Primary Examiner — Bradley T King
Assistant Examiner — Mahbubur Rashid
(74) Attorney, Agent, or Firm — Morgan, Lewis & Bockius LLP

(57) ABSTRACT

A valve assembly including: a valve body comprising a valve chamber, a first fluid port, a second fluid port, and a third fluid port, wherein the first fluid port, the second fluid port and the third fluid port are in fluid communication with the valve chamber; a first plunger movably disposed within the valve chamber, wherein when the first plunger is in the open position, the first fluid port is in fluid communication with the second fluid port, and wherein when the first plunger is in the closed position the first fluid port is fluidly isolated from the second fluid port; and a second plunger movably disposed within the valve chamber, wherein when (Continued)

the second plunger is in the open position the second fluid port (8b) is in fluid communication with the third fluid port, and wherein when the second plunger is in the closed position, the second fluid port is fluidly isolated from the third fluid port.

14 Claims, 4 Drawing Sheets

(51) Int. Cl.
  *B60T 8/50* (2006.01)
  *B60T 15/02* (2006.01)
(52) U.S. Cl.
  CPC .......... *B60T 13/686* (2013.01); *B60T 8/3645* (2013.01); *B60T 8/5025* (2013.01); *B60T 15/028* (2013.01)
(58) Field of Classification Search
  CPC .......... B60T 8/3665; Y10T 137/88038; Y10T 137/87917; Y10T 137/8671; Y10T 137/86919; Y10T 137/86928; F16K 1/443; F16K 11/22
  USPC ............. 137/614.21, 596.17, 625.65, 625.25
  See application file for complete search history.

(56) References Cited

U.S. PATENT DOCUMENTS

| | | | |
|---|---|---|---|
| 4,201,116 A * | 5/1980 | Martin | F15B 13/0402 137/625.64 |
| 4,538,129 A * | 8/1985 | Fisher | F16K 31/082 137/625.65 |
| 4,611,631 A * | 9/1986 | Kosugi | F16K 31/0627 137/625.27 |
| 4,773,447 A * | 9/1988 | Imanaka | B60T 8/3235 137/627.5 |
| 4,859,005 A | 8/1989 | Rey et al. | |
| 4,860,794 A | 8/1989 | Parrott et al. | |
| 4,964,681 A * | 10/1990 | Burgdorf | B60T 8/26 303/115.4 |
| 5,076,538 A * | 12/1991 | Mohr | B60T 8/363 251/129.02 |
| 5,234,265 A * | 8/1993 | Tyler | B60T 8/00 303/118.1 |
| 5,246,280 A * | 9/1993 | Sigi | B60T 8/341 303/113.2 |
| 5,309,944 A * | 5/1994 | Chikamatsu | F15B 13/0435 137/625.65 |
| 5,445,446 A * | 8/1995 | Yamamuro | B60T 8/36 303/117.1 |
| 5,472,266 A * | 12/1995 | Volz | B60T 8/5031 303/115.4 |
| 5,738,142 A * | 4/1998 | Eike | B60T 13/22 137/596.17 |
| 6,047,718 A * | 4/2000 | Konsky | F16K 1/443 137/1 |
| 6,227,183 B1 * | 5/2001 | Miyoshi | F02M 26/12 123/568.23 |
| 6,279,552 B1 * | 8/2001 | Okada | F16K 1/443 123/568.2 |
| 6,309,033 B1 * | 10/2001 | Zaviska | B60T 8/363 137/630.14 |
| 6,708,675 B2 * | 3/2004 | Kato | F02B 47/08 123/568.12 |
| 7,073,770 B2 * | 7/2006 | Uryu | F16K 31/0637 137/596.17 |
| 7,523,763 B2 * | 4/2009 | Katsuta | F15B 13/0405 137/625.65 |
| 7,878,604 B2 * | 2/2011 | Hanawa | F16F 9/46 188/290 |
| 8,061,384 B2 * | 11/2011 | Isono | G05D 16/2024 137/596.18 |
| 8,100,142 B2 * | 1/2012 | Sasago | F15B 13/0405 137/596.17 |
| 8,622,048 B2 * | 1/2014 | Young | F02M 25/0836 123/516 |
| 8,925,582 B2 * | 1/2015 | Lee | F01L 13/00 137/596.17 |
| 9,027,598 B2 * | 5/2015 | Schneider | F16K 31/0613 137/625.68 |
| 9,062,798 B2 * | 6/2015 | Neef | F16K 47/04 |
| 9,074,702 B2 * | 7/2015 | Morise | F16K 31/0686 |
| 9,423,045 B2 * | 8/2016 | Mills | F16K 27/048 |
| 9,523,438 B2 * | 12/2016 | Bamber | F16K 11/04 |
| 9,915,360 B2 * | 3/2018 | Simeon | F16K 11/056 |
| 2002/0067073 A1 * | 6/2002 | Gegalski | B60T 8/363 303/119.1 |
| 2008/0258544 A1 * | 10/2008 | Iyatani | B60T 8/368 303/10 |
| 2012/0211686 A1 * | 8/2012 | Okamoto | F16K 31/0624 251/129.15 |

FOREIGN PATENT DOCUMENTS

| | | |
|---|---|---|
| DE | 19703759 A1 | 8/1998 |
| EP | 0232783 A2 | 8/1987 |

\* cited by examiner

VALVE ASSEMBLY AND ANTI-LOCK BRAKING SYSTEM INCLUDING THE SAME

RELATED APPLICATIONS

This application claims the benefit of German Patent Application No. 102017208310.7, filed on May 17, 2017, the disclosure of which is incorporated by reference herein.

The present invention relates to a valve assembly, in particular for use in an electric and/or hydraulic anti-lock braking system for a vehicle, and to an anti-lock braking system including said valve assembly.

A brake assembly for braking an automotive vehicle wheel typically includes a brake disc fixedly coupled to the rotatable wheel and at least one hydraulically actuatable brake caliper fixedly coupled to a stationary portion of the vehicle. The caliper may then be actuated to apply a braking force to the brake disc, thereby increasing friction between the stationary caliper and the rotating brake disc to brake the wheel.

Known anti-lock braking systems (ABS) and electronic stability control (ESC) systems for vehicles usually comprise a hydraulic control unit (HCU) including a plurality of valves for actuating the brake calipers associated with the vehicle wheels. For example, each vehicle wheel may be equipped with a wheel speed sensor for detecting wheel speed data of that wheel, and the HCU may be configured to actuate the brake calipers based on the detected wheel speed data. Usually, the HCU of an ABS/ESC system is configured to selectively: increase the hydraulic pressure applied to a given caliper to increase the braking force applied to the wheel; hold the hydraulic pressure applied to the caliper at a constant value to keep the braking force applied to the wheel constant; and decrease the hydraulic pressure applied to the caliper to decrease the braking force applied to the wheel.

To this end, HCUs of known ABS/ESC systems typically comprise at least one normally open (NO) solenoid valve and at least one normally closed (NC) solenoid valve for controlling the ABS function of each brake caliper. Furthermore, the HCU typically comprises emergency shut down solenoid valves (ESV) and traction control (TC) solenoid valves. This large number of valves significantly adds to the size and to the complexity of the HCU.

Thus, there is demand for a valve configured for use in an anti-lock braking system for a vehicle, wherein the valve has a preferably small size and a preferably low degree of complexity. Furthermore, there is demand for an anti-lock braking system for a vehicle having an HCU with a preferably small size and a preferably low degree of complexity.

These problems are solved by a valve assembly according to claim 1 and by an anti-lock braking system for a vehicle including said valve assembly. Special embodiments are described in the dependent claims.

The presently proposed valve assembly, which is particularly suited for use in an electric and/or hydraulic anti-lock braking system for a vehicle, includes at least:

- a valve body comprising a valve chamber, a first fluid port, a second fluid port, and a third fluid port, wherein the first fluid port, the second fluid port and the third fluid port are in fluid communication with the valve chamber;
- a first plunger movably disposed within the valve chamber and configured to be moved between an open position and a closed position, wherein when the first plunger is in the open position the first fluid port is in fluid communication with the second fluid port, and wherein when the first plunger is in the closed position the first fluid port is fluidly isolated from the second fluid port; and
- a second plunger movably disposed within the valve chamber and configured to be moved between an open position and a closed position, wherein when the second plunger is in the open position the second fluid port is in fluid communication with the third fluid port, and wherein when the second plunger is in the closed position the second fluid port is fluidly isolated from the third fluid port.

Typically, the first fluid port and the third fluid port are fluidly isolated from one another if at least one of the first and the second plunger is in the closed position.

Due to the fact that the valve assembly includes a valve chamber in fluid communication with a first, a second, and a third fluid port, a first plunger movably disposed in the valve chamber and configured to control the flow of fluid between the first and the second fluid port, and a second plunger movably disposed in the valve chamber and configured to control the flow of fluid between the second and the third fluid port, it is capable of providing the above-described ABS functions while featuring a high degree of compactness.

The presently proposed electric and/or hydraulic anti-lock braking system for a vehicle comprises at least:
- the above-described valve assembly;
- a master cylinder in fluid communication with the first fluid port of the valve assembly;
- at least one brake caliper in fluid communication with the second fluid port of the valve assembly; and
- a low pressure accumulator in fluid communication with the third fluid port of the valve assembly, and in fluid communication with the master cylinder, wherein preferably the low pressure accumulator is in fluid communication with the master cylinder by way of a fluid pump.

Typically, the anti-lock braking system further comprises a brake disc fixedly coupled to a wheel, for example a wheel of an automotive vehicle. The master cylinder may provide a high hydraulic pressure to the brake caliper for actuating the caliper. When actuated, the brake caliper may apply a braking force to the brake disc to brake the wheel.

In order to increase the hydraulic pressure applied to the brake caliper the first plunger may be moved to or kept in the open position and the second plunger may be moved to or kept in the closed position. In this configuration the master cylinder is in fluid communication with the brake caliper, so high pressure brake fluid from the master cylinder is provided to the brake caliper by way of the first fluid port, the valve chamber, and the second fluid port. At the same time the master cylinder and the brake caliper are fluidly isolated from the low pressure accumulator, so no fluid may be drained to the low pressure accumulator from the master cylinder or from the brake caliper. The master cylinder may increase the hydraulic pressure applied to the brake caliper until the hydraulic pressure applied to the brake caliper reaches a desired value.

In order to hold the hydraulic pressure applied to the brake caliper at its current value, both the first plunger and the second plunger may be moved to or kept in the closed position. In this configuration the brake caliper is fluidly isolated from the master cylinder and from the low pressure accumulator, so no fluid may be drained from the brake caliper and the hydraulic pressure applied to the brake caliper is held at its current value.

In order to reduce the hydraulic pressure applied to the brake caliper, the first plunger may be moved to or kept in the closed position, and the second plunger may be moved to or kept in the open position. In this configuration the brake caliper is in fluid communication with the low pressure accumulator. At the same time, the master cylinder is fluidly isolated from the brake caliper and from the low pressure accumulator. Brake fluid from the brake caliper may be drained to the low pressure accumulator by way of the second fluid port, the valve chamber, and third fluid port.

However, it is understood that the presently proposed valve assembly may be used in hydraulic systems other than the presently proposed anti-lock braking system. As non-limiting examples, the valve assembly may be used in a hydraulically actuated robot or in a hydraulically actuated lifting mechanism.

To improve the functionality and flexibility of the valve assembly, the first plunger and the second plunger may be configured to be actuated independently of one another.

For example, the valve assembly may include a first solenoid fixedly arranged with respect to the valve body or fixedly coupled to the valve body, and a first magnet fixedly coupled to the first plunger. The first plunger may then be actuated by way of an electric current in the first solenoid. Additionally or alternatively, the valve assembly may include a second solenoid fixedly arranged with respect to the valve body or fixedly coupled to the valve body, and a second magnet fixedly coupled to the second plunger. The second plunger may then be actuated by way of an electric current in the second solenoid. If the valve assembly comprises a first and a second solenoid, these solenoids may be configured such that the electric currents in the solenoids may be controlled independently.

It is likewise conceivable that at least one of the first and the second plunger is configured to be actuated hydraulically. For example, the valve assembly may comprise a first hydraulic control chamber, wherein the first hydraulic control chamber and the first plunger are configured such that the first plunger may be actuated via a hydraulic pressure in the first hydraulic control chamber. Preferably, the first hydraulic control chamber is fluidly isolated from the valve chamber. Additionally or alternatively, the valve assembly may comprise a second hydraulic control chamber, wherein the second hydraulic control chamber and the second plunger are configured such that the second plunger may be actuated via a hydraulic pressure in the second hydraulic control chamber. Preferably, the second hydraulic control chamber is fluidly isolated from the valve chamber and/or from the first hydraulic control chamber.

The valve assembly may comprise a first fluid connection providing selective fluid communication between the first fluid port and the second fluid port, wherein the first plunger is configured to selectively open and close the first fluid connection between the first fluid port and the second fluid port. That is, when the first plunger is in the open position the first fluid port is in fluid communication with the second fluid port by way of the first fluid connection. For example, the valve chamber may comprise a first compartment in fluid communication with the first fluid port and a second compartment in fluid communication with the second fluid port. The first fluid connection may then be configured as a channel or as an opening between the first compartment and the second compartment. This channel or opening may be formed between the first plunger and the valve body, for example.

The first plunger may be continuously movable. The first plunger and the first fluid connection may be configured such that a minimum cross section of the first fluid connection perpendicular to a direction of movement of the first plunger is continuously variable by moving the first plunger. This may allow controlling the flow of fluid between the first fluid port and the second fluid port, for example for smoothly opening or closing the first fluid connection between the first and the second fluid port. To that end, a cross section of the first plunger perpendicular to a direction of movement of the first plunger and/or the cross section of first fluid connection perpendicular to the direction of movement of the first plunger may vary along the direction of movement of the first plunger. For example, the first fluid connection and/or a portion of the first plunger may have a conical shape.

Similarly, the valve assembly may comprise a second fluid connection providing selective fluid communication between the second fluid port and the third fluid port, wherein the second plunger is configured to selectively open and close the second fluid connection between the second fluid port and the third fluid port. That is, when the second plunger is in the open position the second fluid port is in fluid communication with the third fluid port by way of the second fluid connection. For example, the valve chamber may comprise a second compartment in fluid communication with the second fluid port and a third compartment in fluid communication with the third fluid port. The second fluid connection may then be configured as a channel or as an opening between the second compartment and the third compartment. This channel or opening may be formed between the second plunger and the valve body, for example.

The second plunger may be continuously movable. The second plunger and the second fluid connection may be configured such that a minimumcross section of the second fluid connection perpendicular to a direction of movement of the second plunger is continuously variable by moving the second plunger. This may allow controlling the flow of fluid between the second fluid port and the third fluid port, for example for smoothly opening or closing the second fluid connection between the second and the third fluid port. To that end, a cross section of the second plunger perpendicular to a direction of movement of the second plunger and/or the cross section of second fluid connection perpendicular to the direction of movement of the second plunger may vary along the direction of movement of the second plunger. For example, the second fluid connection and/or a portion of the second plunger may have a conical shape.

The direction of movement of the first plunger and the direction of movement of the second plunger may be aligned in parallel. Such an arrangement may add to the advantageous compactness of the valve assembly. For example, the first plunger and the second plunger may be disposed concentrically with respect to a valve axis defining the direction of movement of the first and the second plunger. The first fluid port, the second fluid port and the third fluid port may be spaced from one another along the valve axis.

The first plunger may include a recess and a first opening, the recess extending at least partially through the first plunger and the recess opening into the valve chamber at the first opening. The recess of the first plunger may have an elongate shape and may extend through the first plunger in parallel to the direction of movement of the first plunger or in parallel to the valve axis. In particular, the recess of the first plunger may be concentrically aligned with the valve axis. The second plunger may be movably received within the recess of the first plunger. Further, the second plunger may protrude out of the first opening or may be configured to protrude out of the first opening of the first plunger. This allows a particularly compact arrangement of the first and the second plunger.

The first plunger may further include a second opening, the recess extending through the first plunger from the first opening to the second opening. The second plunger may then extend through the recess from the first opening to the second opening. In other words, the first plunger may be movably disposed on the second plunger. This arrangement may further contribute to the compactness of the valve assembly. In particular, the first plunger may have a first length and the second plunger may have a second length, wherein the first length and the second length are determined in parallel to the direction of movement of the first plunger and the second plunger and wherein the second length is larger than the first length.

The valve assembly may include a first biasing member, in particular a first elastic biasing member such as a first spring. The first biasing member may be disposed and configured to bias the first plunger toward the open position. The first biasing member may be supported on the valve body. In particular, the first plunger and the first biasing member may be configured such that the first plunger is in the open position unless the first plunger is actuated, for example by way of a current in the above-described first solenoid or by way of a hydraulic pressure in the above-described first hydraulic control chamber.

Additionally or alternatively, the valve assembly may include a second biasing member, in particular a second elastic biasing member such as a second spring. The second biasing member may be disposed and configured to bias the second plunger toward the open position. The second biasing member may be supported on the valve body. In particular, the second plunger and the second biasing member may be configured such that the second plunger is in the open position unless the second plunger is actuated, for example by way of a current in the above-described second solenoid or by way of a hydraulic pressure in the above-described second hydraulic control chamber.

The first plunger may be configured to be moved from the closed position of the first plunger to the open position of the first plunger by moving the first plunger in a first direction, and the second plunger may be configured to be moved from the closed position of the second plunger to the open position of the second plunger by moving the second plunger in a second direction opposite the first direction. However, it is likewise conceivable that the first and the second plunger are configured to be moved from the closed position to the open position by moving the first and the second plunger in the same direction.

An embodiment of the presently proposed valve assembly and anti-lock braking system is described in the following detailed description and depicted in the accompanying drawing in which.

Figure 2A:
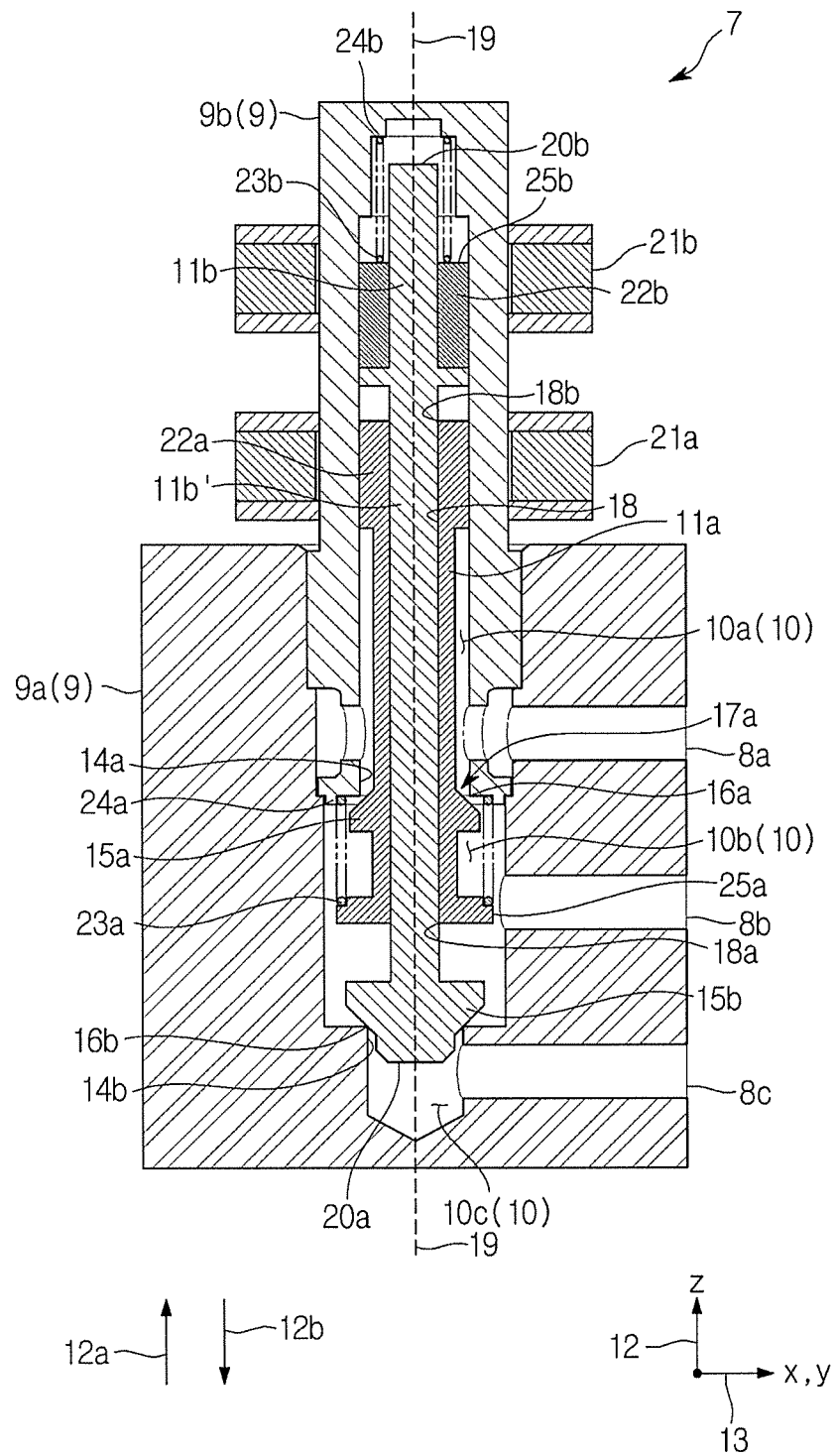
FIG. 2A shows a detailed view of the valve assembly of FIG. 1 in a first configuration, wherein a first plunger of the valve assembly is in an open position and a second plunger of the valve assembly is in a closed position.
Figure 2B:
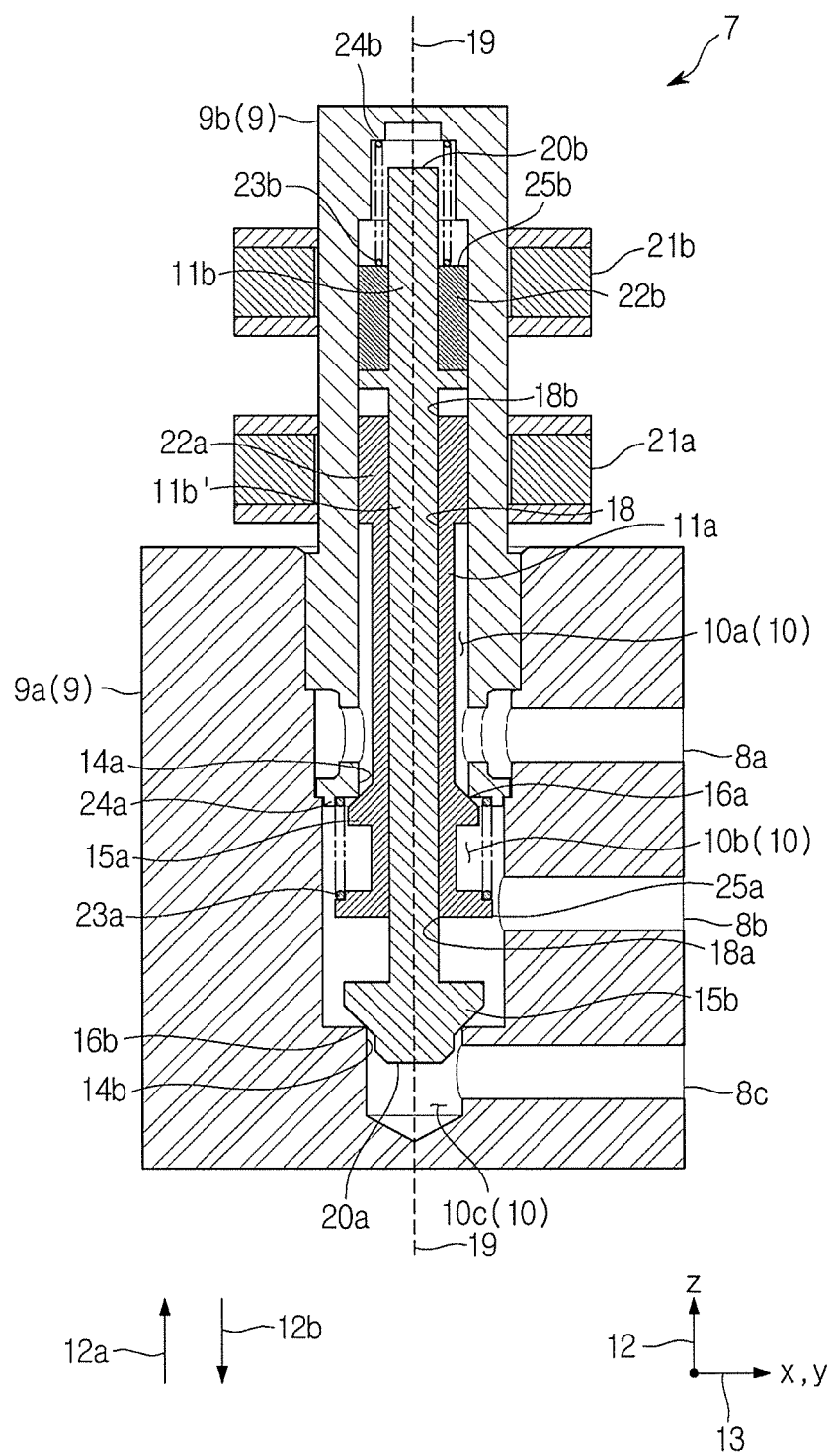
Figure 2C:
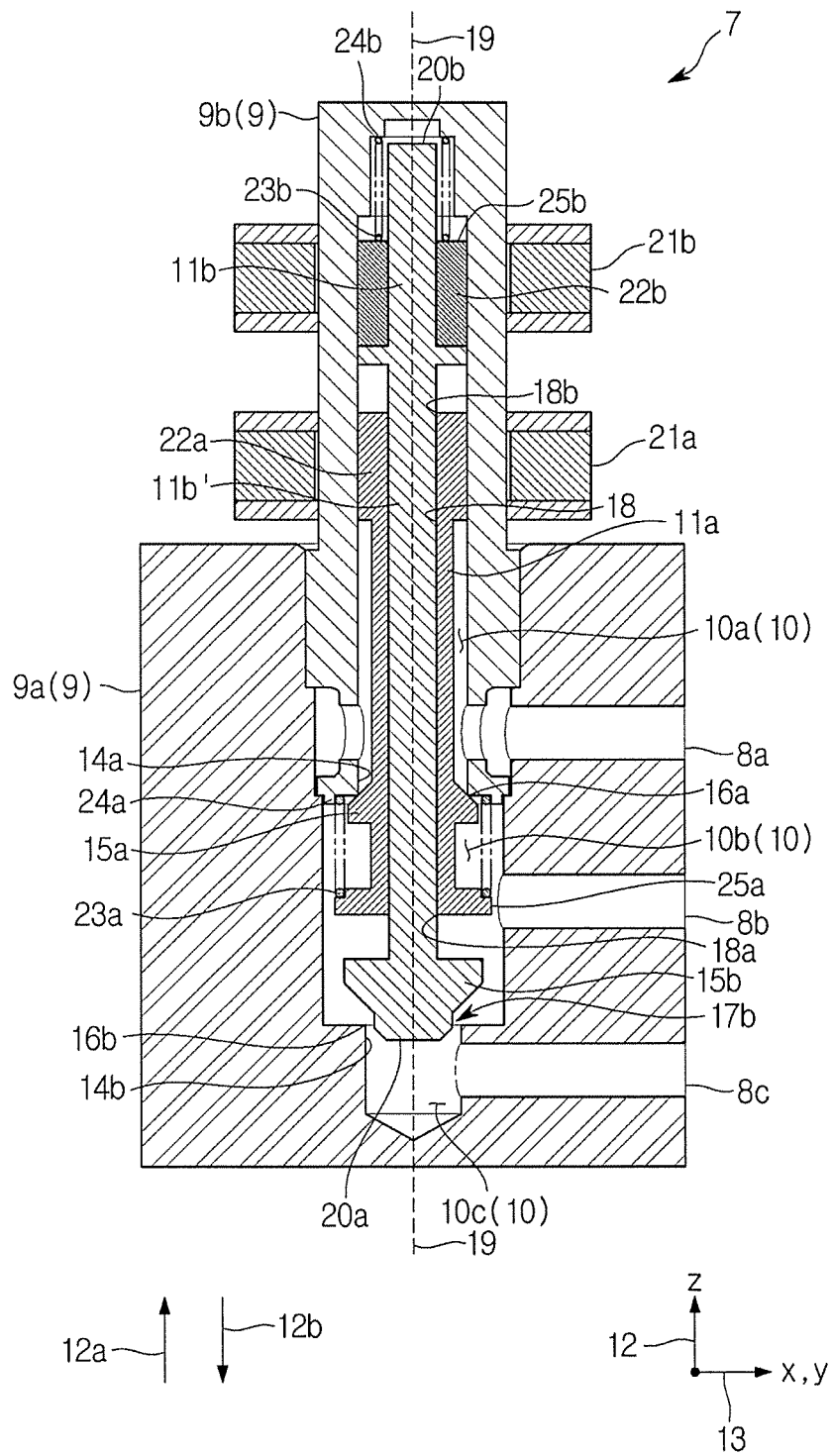

FIG. 2B the valve assembly of FIG. 2A in a second configuration, wherein both the first plunger is in a closed position and the second plunger is in the closed position; and FIG. 2C the valve assembly of FIGS. 2A and 2B in a third configuration, wherein the first plunger is in the closed position and the second plunger is in an open position.

Figure 1:
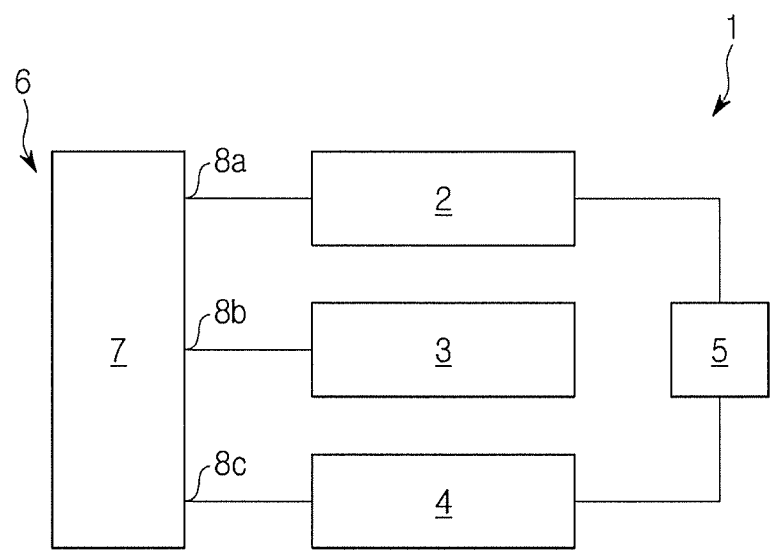
FIG. 1 shows a schematic illustration of an anti-lock braking system including a master cylinder, a brake caliper and a low pressure accumulator selectively in fluid communication with one another by way of a valve assembly in accordance with the present invention.

FIG. 1 schematically illustrates an anti-lock braking system 1 for a vehicle (not shown). The anti-lock braking system 1 includes a hydraulic circuit comprising a hydraulic master cylinder 2, a hydraulically actuatable brake caliper 3, a low pressure fluid accumulator 4 and a fluid pump 5. The master cylinder 2, the brake caliper 3 and the low pressure fluid accumulator 4 are selectively in fluid communication with one another by way of a hydraulic control unit (HCU) 6 comprising a valve assembly 7. The HCU 6 including the valve assembly 7 may be electrically controllable by way of an electronic control unit (not shown). The master cylinder 2, the brake caliper 3, and the low pressure fluid accumulator 4 are fluidly connected with a first fluid port 8a, with a second fluid port 8b, and with a third fluid port 8c of the valve assembly 7, respectively. The fluid pump 5 is configured to pump fluid from the low pressure fluid accumulator 4 to the master cylinder 2. It is understood that FIG. 1 is merely an exemplary illustration of the system 1 and that other embodiments of the system 1 not explicitly depicted here may include more than one brake caliper 3, and that the HCU 6 of the system 1 may include more than one valve assembly 7.

The brake caliper 3 may include one or more hydraulic actuators such as one or more hydraulic pistons, for example. The master cylinder 2 is configured to provide a hydraulic pressure to the brake caliper 3 for actuating the brake caliper 3 by way of the valve assembly 7. When the master cylinder 2 applies a hydraulic pressure to the brake caliper 3, the brake caliper 3 may apply a braking force to a brake disc fixedly coupled to a vehicle wheel for braking the wheel (not shown).

The valve assembly 7 has at least three configurations (see FIGS. 2A-C). In the first configuration (see FIG. 2A), the valve assembly 7 provides fluid communication between the first fluid port 8a and the second fluid port 8b, and fluidly isolates the first fluid port 8a and the second fluid port 8b from the third fluid port 8c. That is, when the valve assembly 7 is switched to the first configuration, the master cylinder 2 may increase a hydraulic pressure applied to the brake caliper 3 to increase the braking force applied to the wheel.

In the second configuration (see FIG. 2B), the valve assembly 7 fluidly isolates the fluid ports 8a, 8b, and 8c and, thus, the master cylinder 2, the brake caliper 3, and the low pressure fluid accumulator 4 from one another. That is, when the valve assembly 7 is switched to the second configuration, a hydraulic pressure applied to the brake caliper 3 is kept constant.

And in the third configuration (see FIG. 2C), the valve assembly 7 provides fluid communication between the second fluid port 8b and the third fluid port 8c, and fluidly isolates first fluid port 8a from the second fluid port 8b and from the third fluid port 8c. That is, when the valve assembly 7 is switched to the third configuration, fluid from the brake caliper 3 is drained to the low pressure fluid accumulator 4, thereby decreasing a hydraulic pressure applied to the brake caliper 3.

FIGS. 2A-C show a more detailed view of the HCU 6 including the valve assembly 7. Here and in the following, recurring features are designated by the same reference signs. Specifically, FIG. 2A illustrates the valve assembly 7 in the above-described first configuration; FIG. 2B illustrates the valve assembly 7 in the above-described second configuration; and FIG. 2C illustrates the valve assembly 7 in the above-described third configuration.

FIG. 2A shows the valve assembly 7 having a valve body 9 including a valve block 9a and a valve cylinder 9b partially received within the valve block 9a. The valve body 9 including the valve block 9a and the valve cylinder 9b may be made of metal, for example. However, it is understood that the valve body 9 may be made of or may comprise other materials. The valve body 9 encloses a valve chamber 10. The fluid ports 8a, 8b, 8c (see also FIG. 1) are in fluid communication with the valve chamber 10.

The valve assembly 7 further comprises a first plunger 11a and a second plunger 11b. The plungers 11a, 11b are movably disposed within the valve chamber 10. More specifically, the plungers 11a, 11b are continuously movable within the valve chamber 10 along a z-direction 12, i. e. along a vertical direction in FIGS. 2A-C. An x-y-plane 13 is aligned perpendicular to the z-direction 12. The plungers 11a, 11b are made of metal, for example. However, it is understood that the plungers 11a, 11b may be made of or may comprise other materials. The valve chamber 10 and the plungers 11a, 11b each have an elongate, cylindrical or essentially cylindrical shape and extend along the z-direction 12 within the valve body 9. Furthermore, the essentially cylindrical valve chamber 10 and the essentially cylindrical plungers 11a, 11b are concentrically disposed with respect to a valve axis 19. The valve axis 19 is aligned in parallel with the z-direction 12 and is a symmetry axis of the essentially cylindrical valve chamber 10 and the essentially cylindrical plungers 11a, 11b.

The first plunger 11a comprises a recess 18 formed as a center boring within the first plunger 11a. The recess 18 extends all the way through the first plunger 11a along the z-direction 12, i. e. along the direction of movement of the first plunger 11a. The recess 18 is disposed concentrically with respect to the valve axis 19. The recess 18 extends from a first opening 18a at a first end of the first plunger 11a to a second opening 18b at a second end of the first plunger 11b. At the first opening 18a, the recess 18 opens into the valve chamber 10, in particular into the second compartment 10b of the valve chamber 10.

An intermediate section 11b' of the second plunger 11b which is disposed in between a first end 20a of the second plunger 11b and a second end 20b of the second plunger 11b is movably received within the recess 18 of the first plunger 11a and extends all the way through the recess 18. In other words, the intermediate section 11b' of the second plunger 11b reaches all the way through the recess 18 or center boring of the first plunger 11a. Or, put yet differently, the first plunger is movably disposed on the second plunger 11b, in particular on the intermediate section 11b' of the second plunger 11b, by way of the recess 18 or center boring of the first plunger 11a. Specifically, the first plunger 11a and the second plunger 11b are configured such that they are movable along the z-direction 12 or along the valve axis 19 independently of one another. That is, the first plunger 11a may be moved while the second plunger 11b is held at a fixed position. Similarly, the second plunger 11b may be moved while the first plunger 11a is held at a fixed position. This arrangement results in an advantageously compact layout and high degree of flexibility of the valve assembly 7.

The first plunger 11a may be moved or actuated using a first solenoid 21a fixedly coupled to the valve body 9 and a first magnet 22a fixedly coupled to the first plunger 11a. Specifically, the first plunger may be moved or actuated by way of an electric current in the first solenoid 21a. Similarly, the second plunger 11b may be moved or actuated using a second solenoid 21b fixedly coupled to the valve body 9 and a second magnet 22b fixedly coupled to the second plunger 11b. Specifically, the second plunger may be moved or actuated by way of an electric current in the second solenoid 21b.

However, it is understood that in other embodiments of the valve assembly 7 not explicitly depicted here the first plunger 11a and/or the second plunger 11b may be configured to be actuated or moved using actuation means other than a solenoid and magnet. For example, in other embodiments the valve assembly 7 may comprise a first hydraulic control chamber and a second hydraulic control chamber. The first plunger 11a and the first hydraulic control chamber may then be configured such that the first plunger 11a may be actuated by way of a hydraulic pressure in the first hydraulic control chamber, and the second plunger 11b and the second hydraulic control chamber may then be configured such that the second plunger 11b may be actuated by way of a hydraulic pressure in the second hydraulic control chamber.

In the embodiment of the valve assembly 7 depicted in FIGS. 2A-C, the valve chamber 10 is divided into a first compartment 10a, a second compartment 10b, and a third compartment 10c. The first compartment 10a is fluidly connected with the first fluid port 8a; the second compartment 10b is fluidly connected with the second fluid port 8b; and the third compartment 10c is fluidly connected with the third fluid port 8c. The first fluid port 8a, the second fluid port 8b and the third fluid port 8c are distanced from one another along the z-direction 12. Specifically, the second fluid port 8b is disposed in between the first fluid port 8a and the third fluid port 8c along the z-direction 12. The first compartment 10a and the second compartment 10b are selectively in fluid communication with one another by way of a first opening 14a, and the second compartment 10b and the third compartment 10c are selectively in fluid communication with one another by way of a second opening 14b.

The first plunger 11a comprises a conical portion 15a which is configured to be partially received in the first opening 14a between the first compartment 10a and the second compartment 10b of the valve chamber 10. That is, a portion of the valve body 9 enclosing the first opening 14a forms a first valve seat 16a for the conical portion 15a of the first plunger 11a. The conical portion 15a of the first plunger 11a tapers along the z-direction 12, i. e. along the direction of movement of the first plunger 11a. In particular, a minimum cross section of the conical portion 15a may be smaller than the cross section of the first opening 14a at the first valve seat 16a, and a maximum cross section of the conical portion 15a may be larger than the cross section of the first opening 14a at the first valve seat 16a, wherein the cross sections are determined in the x-y-plane 13 perpendicular to the direction of movement of the first plunger 11a.

The first plunger 11a may be continuously moved between a closed position depicted in FIGS. 2B and 2C, and an open position depicted in FIG. 2A. In the closed position of the first plunger 11a (see FIGS. 2B and 2C), the conical portion 15a of the first plunger 11a is pressed against the first valve seat 16a, thereby completely closing and sealing the first opening 14a. In the embodiment shown in FIGS. 2B and 2C, the first plunger 11a being in the closed position includes the conical portion 15a of the first plunger 11a being pressed against the first valve seat 16a in the positive z-direction 12a, i. e. upwards in FIGS. 2B and 2C. When the first plunger 11a is in the closed position, the first fluid port 8a is fluidly isolated from the second fluid port 8b so that no fluid may flow between the first fluid port 8a and the second fluid port 8b. Also, when the first plunger 11a is in the closed position, the first fluid port 8a is fluidly isolated from the third fluid port 8c so that no fluid may flow between the first fluid port 8a and the third fluid port 8c.

From the closed position of the first plunger 11a depicted in FIGS. 2B and 2C the first plunger 11a may be moved to the open position of the first plunger 11a depicted in FIG. 2A by moving the first plunger 11a in the negative z-direction 12b.

When the first plunger 11a is in the open position (see FIG. 2A), a clearance is formed between the conical portion 15a of the first plunger 11a and the first valve seat 16a, and the first opening 14a is at least partially uncovered. The first plunger 11a and the first opening 14a are configured such that when the first plunger 11a is in the open position, a first fluid connection 17a is formed between the first valve seat 16a and the first plunger 11a (see FIG. 2A). That is, when the first plunger 11a is in the open position, the first fluid port 8a is in fluid communication with the second fluid port 8b by way of the first fluid connection 17a.

Here, the movement of the first plunger 11a from the closed position to the open position is supported by a first spring 23a which biases the first plunger 11a toward the open position. The first spring 23a is supported by a first support portion 24 of the valve body 9 and pushes against a first support portion 25a of the first plunger 11a to force the first plunger 11a in the negative z-direction 12b. Specifically, the first spring 23a and the first plunger 11a are configured such that the first spring forces the first plunger 11a to the open position unless the first plunger 11a is actuated using the first solenoid 21a and the first magnet 22a. In other words, the first plunger 11a, the first spring 23a and the first opening 14a are configured such that they form a normally open valve between the first fluid port 8a and the second fluid port 8b. By actuating the first plunger 11a using the first solenoid 21a and the first magnet 22a the first plunger 11a may be moved in the positive z-direction 12a to close the first fluid connection 17a.

Due to the conical shape of the conical portion 15a of the first plunger 11a the minimum cross section of the first fluid connection 17a between the first compartment 10a and the second compartment 10b of the valve chamber 10 may be continuously varied by moving the first plunger 11a, which allows a smooth opening and a smooth closing of the first fluid connection 17a and a smooth braking maneuver.

The second plunger 11b likewise comprises a conical portion 15b which is configured to be partially received in the second opening 14b between the second compartment 10b and the third compartment 10c of the valve chamber 10. That is, a portion of the valve body 9 enclosing the second opening 14b forms a second valve seat 16b for the conical portion 15b of the second plunger 11b. The conical portion 15b of the second plunger 11b tapers along the z-direction 12, i. e. along the direction of movement of the second plunger 11b. In particular, a minimum cross section of the conical portion 15b may be smaller than the cross section of the second opening 14b at the second valve seat 16b, and a maximum cross section of the conical portion 15b may be larger than the cross section of the second opening 14b at the second valve seat 16b, wherein the cross sections are again determined in the x-y-plane 13 perpendicular to the direction of movement of the second plunger 11b.

The second plunger 11b may be continuously moved between a closed position depicted in FIGS. 2A and 2B, and an open position depicted in FIG. 2C. In the closed position of the second plunger 11b (see FIGS. 2A and 2B), the conical portion 15b of the second plunger 11b is pressed against the second valve seat 16b, thereby completely closing and sealing the second opening 14b. In the embodiment shown in FIGS. 2A and 2B, the second plunger 11b being in the closed position includes the conical portion 15b of the second plunger 11b being pressed against the second valve seat 16b in the negative z-direction 12b, i. e. downwards in FIGS. 2A and 2B. When the second plunger 11b is in the closed position, the second fluid port 8b is fluidly isolated from the third fluid port 8c so that no fluid may flow between the second fluid port 8b and the third fluid port 8c. Also, when the second plunger 11b is in the closed position, the first fluid port 8a is fluidly isolated from the third fluid port 8c so that no fluid may flow between the first fluid port 8a and the third fluid port 8c.

From the closed position of the second plunger 11b depicted in FIGS. 2A and 2B the second plunger 11b may be moved to the open position of the second plunger 11b (see FIG. 2C) by moving the second plunger 11b in the positive z-direction 12a. When the second plunger 11b is in the open position (see FIG. 2C), a clearance is formed between the conical portion 15b of the second plunger 11b, and the second valve seat 16b and the second opening 14b is at least partially uncovered. The second plunger 11b and the second opening 14b are configured such that when the second plunger 11b is in the open position, a second fluid connection 17b is formed between the second valve seat 16b and the second plunger 11b (see FIG. 2C). That is, when the second plunger 11b is in the open position, the second fluid port 8b is in fluid communication with the third fluid port 8c by way of the second fluid connection 17b.

Here, the movement of the second plunger 11b from the open position to the closed position is supported by a second spring 23b which biases the second plunger 11b toward the closed position. The second spring 23b is supported by a second support portion 24b of the valve body 9 and pushes against a second support portion 25b of the second plunger 11b to force the second plunger 11b in the negative z-direction 12b. Specifically, the second spring 23b and the second plunger 11b are configured such that the second spring 23b forces the second plunger 11b to the closed position unless the second plunger 11b is actuated using the second solenoid 21b and the second magnet 22b. In other words, the second plunger 11b, the second spring 23b and the second opening 14b are configured such that they form a normally closed valve between the second fluid port 8b and the third fluid port 8c. By actuating the second plunger 11b using the second solenoid 21b and the second magnet 22b the second plunger 11b may be moved in the positive z-direction 12a to open the second fluid connection 17b.

Due to the conical shape of the conical portion 15b of the second plunger 11b the minimum cross section of the second fluid connection 17b between the second compartment 10b and the third compartment 10c of the valve chamber 10 may be continuously varied by moving the second plunger 11b, which allows a smooth opening and a smooth closing of the second fluid connection 17b and a smooth braking maneuver.

The invention claimed is:

1. A valve assembly for use in an electric and/or hydraulic anti-lock braking system for a vehicle, the valve assembly including:

a valve body comprising a valve chamber, a first fluid port, a second fluid port, and a third fluid port, wherein the first fluid port, the second fluid port and the third fluid port are in fluid communication with the valve chamber;

a first plunger movably disposed within the valve chamber and configured to be moved between an open position and a closed position, wherein when the first plunger is in the open position the first fluid port is in fluid communication with the second fluid port, and wherein when the first plunger is in the closed position the first fluid port is fluidly isolated from the second fluid port; and a second plunger movably disposed within the valve chamber and configured to be moved between an open position and a closed position, wherein when the second plunger is in the open position the second fluid port is in fluid communication with the third fluid port, and wherein when the second plunger is in the closed position the second fluid port is fluidly isolated from the third fluid port, wherein the first plunger is configured to be moved from the closed position to the open position by moving the first plunger in a first direction, and the second plunger is configured to be moved from the closed position to the open position by moving the second plunger toward the first plunger in a second direction opposite the first direction, wherein the second fluid port is arranged on the same side as the first fluid port and the third fluid port with respect to the first and second plungers, wherein the first plunger and the second plunger overlap each other in a direction perpendicular to the first and second directions, the first plunger being disposed outside the second plunger in the direction perpendicular to the first and second directions, and wherein when the first plunger is in the open position the first fluid port is in fluid communication with the second fluid port by way of a first fluid connection, wherein the first plunger is continuously movable and wherein the first plunger and the first fluid connection are configured such that a minimum cross section of the first fluid connection is continuously variable by moving the first plunger.

2. The valve assembly according to claim 1, wherein the first plunger and the second plunger are configured to be actuated independently of one another.

3. The valve assembly according to claim 1, wherein when the second plunger is in the open position the second fluid port is in fluid communication with the third fluid port by way of a second fluid connection, wherein the second plunger is continuously movable and wherein the second plunger and the second fluid connection are configured such that a minimum cross section of the second fluid connection is continuously variable by moving the second plunger.

4. The valve assembly according to claim 1, wherein a direction of movement of the first plunger and a direction of movement of the second plunger are aligned in parallel.

5. The valve assembly according to claim 4, wherein the first plunger and the second plunger are disposed concentrically with respect to a valve axis defining the direction of movement of the first plunger and of the second plunger.

6. The valve assembly according to claim 4, wherein the first fluid port, the second fluid port and the third fluid port are spaced from one another along the valve axis.

7. The valve assembly according to claim 1, wherein the first plunger includes a recess and a first opening, the recess extending at least partially through the first plunger and the recess opening into the valve chamber at the first opening, wherein the second plunger is movably received within the recess and wherein the second plunger protrudes out of the first opening or is configured to protrude out of the first opening.

8. The valve assembly according to claim 7, wherein the first plunger includes a second opening, the recess extending through the first plunger from the first opening to the second opening, and wherein the second plunger extends through the recess from the first opening to the second opening so that the first plunger is movably disposed on the second plunger.

9. The valve assembly according to claim 1, including a first solenoid fixedly arranged with respect to the valve body or fixedly coupled to the valve body, and further including a first magnet fixedly coupled to the first plunger, wherein the first plunger is configured to be actuated by way of an electric current in the first solenoid.

10. The valve assembly according to claim 1, further including a second solenoid fixedly arranged with respect to the valve body or fixedly coupled to the valve body, and further including a second magnet fixedly coupled to the second plunger, wherein the second plunger is configured to be actuated by way of an electric current in the second solenoid.

11. The valve assembly according to claim 1, including a first spring biasing the first plunger toward the open position.

12. The valve assembly according to claim 1, including a second spring biasing the second plunger toward the closed position.

13. An anti-lock braking system for a vehicle, comprising:
the valve assembly according to claim 1;
a master cylinder in fluid communication with the first fluid port of the valve assembly;
a brake caliper in fluid communication with the second fluid port of the valve assembly; and
a low pressure accumulator in fluid communication with the third fluid port of the valve assembly, and in fluid communication with the master cylinder, preferably by way of a fluid pump.

14. The valve assembly according to claim 1, wherein the first plunger and the second plunger contact each other in a direction perpendicular to the first and second directions.

* * * * *